(12) United States Patent
Hsu et al.

(10) Patent No.: US 12,422,079 B1
(45) Date of Patent: Sep. 23, 2025

(54) PIPE COUPLING STRUCTURE FOR FLUID TRANSPORTATION SYSTEM

(71) Applicant: FOSITEK CORPORATION, New Taipei (TW)

(72) Inventors: An-Szu Hsu, New Taipei (TW); Chia-Meng Chang, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/773,601

(22) Filed: Jul. 16, 2024

(30) Foreign Application Priority Data

Jun. 27, 2024 (TW) .................. 113124052

(51) Int. Cl.
*F16L 37/34* (2006.01)
*F16L 29/04* (2006.01)

(52) U.S. Cl.
CPC .............. *F16L 37/34* (2013.01); *F16L 29/04* (2013.01)

(58) Field of Classification Search
CPC .................................. F16L 37/34; F16L 29/04
See application file for complete search history.

(56) References Cited

U.S. PATENT DOCUMENTS

| | | | | |
|---|---|---|---|---|
| 2,319,015 A | * | 5/1943 | Speth | F16L 29/04 137/614.03 |
| 2,456,045 A | * | 12/1948 | Brock | F16L 29/04 137/614.03 |
| 3,120,968 A | * | 2/1964 | Calvin | F16L 37/34 285/321 |
| 3,450,424 A | * | 6/1969 | Calisher | F16L 37/34 285/305 |
| 3,460,569 A | * | 8/1969 | Reinker, Jr. | F16L 37/096 285/71 |

(Continued)

FOREIGN PATENT DOCUMENTS

| | | | | |
|---|---|---|---|---|
| CN | 110608329 A | * | 12/2019 | F16L 29/04 |
| EP | 0487253 A1 | | 5/1992 | |

(Continued)

OTHER PUBLICATIONS

Search Report dated Nov. 28, 2024 issued by Taiwan Intellectual Property Office for counterpart application No. 113124052.

*Primary Examiner* — David Colon-Morales
(74) *Attorney, Agent, or Firm* — Demian K. Jackson; Jackson IPG PLLC

(57) ABSTRACT

A pipe coupling structure for fluid includes a first and a second coupler connected end-to-end. The first coupler internally defines a shaft moving space having a diameter gradually increased axially inward from a through hole thereof, which is elastically closed by a first shaft supporting base. The second coupler internally defines a valve moving space for receiving a movable valve, which has a second through hole elastically closed by a second shaft head section. When the first coupler is pushed against the movable valve, the second shaft head section is projected forward from the through hole on the movable valve to pushes the first shaft supporting base backward to open the shaft moving space, so that the first and second couplers are internally fluidly communicable with each other. Since the shaft moving space has a gradually increased diameter, a fluid can flow therethrough at the same flowing speed.

9 Claims, 10 Drawing Sheets

(56) References Cited

U.S. PATENT DOCUMENTS

| | | | | |
|---|---|---|---|---|
| 3,645,294 A * | 2/1972 | Allread | F16L 37/34 | 137/614 |
| 3,994,317 A * | 11/1976 | Miyazaki | F16L 29/04 | 137/614.03 |
| 4,815,495 A * | 3/1989 | Remsburg | F16L 37/23 | 251/126 |
| 4,886,301 A * | 12/1989 | Remsburg | F16L 37/56 | 285/39 |
| 5,215,122 A * | 6/1993 | Rogers | F16L 29/04 | 251/149.6 |
| 5,322,330 A * | 6/1994 | Remsburg | F16L 37/56 | 285/39 |
| 5,401,066 A * | 3/1995 | Remsburg | F16L 29/04 | 292/38 |
| 5,709,243 A * | 1/1998 | Wells | F16L 37/34 | 137/614.01 |
| 6,029,701 A * | 2/2000 | Chaffardon | F16L 37/34 | 251/149.9 |
| 6,328,348 B1 * | 12/2001 | Cornford | F16L 37/34 | 285/305 |
| 7,708,029 B2 * | 5/2010 | Kitagawa | F16L 37/34 | 251/149.6 |
| 7,789,100 B2 * | 9/2010 | Gazewood | F16L 29/04 | 137/68.15 |
| 8,602,057 B2 * | 12/2013 | Abura | F16L 37/23 | 251/149.6 |
| 9,791,087 B2 * | 10/2017 | Boothe | F16L 55/1015 | |
| 9,909,703 B2 * | 3/2018 | Van Scyoc | F16L 37/32 | |
| 10,253,911 B1 * | 4/2019 | Quang | F16L 37/123 | |
| 10,995,892 B2 * | 5/2021 | Tiberghien | F16L 37/34 | |
| 11,530,768 B2 * | 12/2022 | Wada | F16L 37/32 | |
| 11,619,332 B2 * | 4/2023 | Jenski, Jr. | F16L 37/34 | 137/798 |
| 12,007,055 B2 * | 6/2024 | Abraham Carabano | F16L 37/086 | |
| 12,044,338 B2 * | 7/2024 | Durieux | F16L 27/00 | |
| 2017/0307122 A1 * | 10/2017 | Imoto | F16L 37/22 | |
| 2024/0175531 A1 * | 5/2024 | Marquis | F16L 37/52 | |

FOREIGN PATENT DOCUMENTS

| | | | | |
|---|---|---|---|---|
| GB | 555692 A | * | 9/1943 | F16L 29/04 |
| GB | 1104697 A | * | 2/1968 | F16L 37/121 |
| TW | 464742 B | | 11/2001 | |
| TW | M662373 U | | 11/2024 | |
| WO | 2024042039 A1 | | 2/2024 | |

\* cited by examiner

PIPE COUPLING STRUCTURE FOR FLUID TRANSPORTATION SYSTEM

This application claims the priority benefit of Taiwan patent application number 113124052 filed on Jun. 27, 2024, the disclosure of which is hereby incorporated by reference in its entirety.

FIELD OF THE INVENTION

The present invention relates to a pipe coupling structure, and more particularly to a pipe coupling structure for fluid transportation system to enable increased fluid flowing speed and pressure through two couplers without the risk of leakage.

BACKGROUND OF THE INVENTION

In the present gas transportation system or water cooling system, pipes and couplers are often used to connect different unit modules to each other, and gas or liquid is flowing in the pipes. These fluid pipes are necessarily disconnected and re-connected now and then for the purpose of system maintenance and repair during the use thereof. In the case the disconnecting of the pipes involves relatively complicated procedures, leakage of the transported fluid possibly occurs to endanger environmental safety and safe and stable operation of the system. Therefore, a quick disconnect coupler, also referred to as a QDC coupler, is required to enable quick disconnection and one-way sealing of pipes. The quick disconnect coupler includes a female coupler that is usually connected to a fixed module, and a male coupler that is connected at an end to a soft hose and at another end to the female coupler to perform quick connection, so as to enable connection or disconnection of the pipes in the system.

Please refer to FIG. 6, which shows the connecting structure of the presently available male and female couplers. As shown, the conventional connecting structure includes a male connecting element 10 having a male main body 11, a male-end valve 12, a male-end valve spring 13, a fixing ring 14, and a central member 15. The male-end valve 12 is received in the male main body 11 and has a valve extension section 122 projecting from a valve outer end 121 and slidably received in an internal recess of the central member 15 to extend through the male-end valve spring 13, the male-end valve 12 and the central member 15. The central member 15 is fitted on the male-end valve 12 and held in the male main body 11. When the male connecting element 10 is disconnected from a female connecting element 20, the male-end valve 12 cooperates with the male main body 11 for the male main body 11 to move axially relative to the fixing ring 14. The female connecting element 20 includes a female main body 21, a female-end valve 22, a female-end valve spring 23, a locking nut 24, and a female-end push rod 25. The female-end push rod 25 is received in the female main body 21 and is locked to the female main body 21 using the locking nut 24. The female-end valve 22 is fitted on the female-end push rod 25 and connected to the female main body 21. When the female connecting element 20 is disconnected from the male connecting element 10, the female-end valve 22 closely works with the female-end push rod 25 and the female main body 21. When the male and the female connecting element 10, 20 are connected to each other, the male main body 11 correspondingly enters the female main body 21, and the female-end push rod 25 is in contact with and presses against the male-end valve 12, so that the male-end valve 12 is axially movable in the male main body 11 and causes the female-end valve 22 to axially move in the female main body 21, and the male and the female main body 11, 21 are fluidly communicable with each other. The above connecting elements 10, 20 have the follow problem.

Please refer to FIGS. 7 and 8, which are sectional views taken along lines 7-7, 8-8 of FIG. 6, respectively. The male main body 11 is guided by the female main body 21 to move. When the female-end push rod 25 moves forward to push the male-end valve 12 backward, a cross-sectional area between the inner wall surfaces of the male-end valve 12 and the male main body 11 is indicated by alphabet "A", as shown in FIG. 7; and a cross-sectional area between a push rod middle section 251 of the female-end push rod 25 and an opening 11a at a free end of the male main body 11 is indicated by alphabet "B", as shown in FIG. 8. As can be seen from FIGS. 7 and 8, the cross-sectional area A is smaller than the cross-sectional area B. Since the cross-sectional area A has a limited size, the volume of fluid that can flow through the cross-sectional area A is decreased. Accordingly, the fluid volume that flows into the male main body 11 via the central member 15 is largely influenced to become reduced. Even if a fluid supply source is large in volume, the narrow cross-sectional area A in the male main body 11 forms a bottle neck to prevent the fluid from flowing therethrough smoothly and accordingly, produces an internal fluid pressure in the male main body 11. When a difference between the internal and the external fluid pressure of the male main body 11 continues for a long time, the male main body 11 might be bent or broken, or the male and the female main body 11, 21 might separate from each other to cause leaking problem. Therefore, it is the first target of the present invention to solve the problem in the connecting structure between the prior art male and female couplers.

SUMMARY OF THE INVENTION

To effectively solve the above problem, a primary object of the present invention is to provide a pipe coupling structure for fluid transportation system. When a first and a second coupler of the pipe coupling structure are connected to communicate with each other, a curved inner wall surface with gradually increased diameter in the first coupler enables the same cross-sectional area between the curved inner wall surface of the first coupler and a first and a second shaft of the first and the second coupler, respectively. The pipe coupling structure of the present invention is leakproof even when the first and the second coupler are displaced radially relative to each other, and the curved inner wall surface of the first coupler enables smooth flowing of the fluid through the couplers to thereby ensure upgraded reliability in coupler connection.

To achieve the above and other objects, the pipe coupling structure for fluid transportation system according to the present invention includes a first coupler and a second coupler.

The first coupler includes a fixing seat, a first shell, a first shaft holder, a first shaft, and a fixing cover.

The fixing seat having an annular receiving groove formed on one side thereof and defining a first penetrating hole axially extending through the fixing seat. The first shell includes a first connection section and a second connection section. A mounting bore is formed at an end of the first connection section; and the second connection section has a through hole located opposite to the mounting bore. The through hole extends axially into the second connection section to form a first shaft moving space having a variable diameter gradually increased axially inward from the through hole. The mounting bore and the first shaft moving space are communicable with the through hole. The first connection section of the first shell is received in the annular receiving groove of the fixing seat, and the second connection section is extended through the first penetrating hole to assemble to the fixing seat.

The first shaft holder is correspondingly connected to the mounting bore of the first shell. The first shaft holder includes a first shaft section and a first shaft hole. A plurality of first connecting ribs is extended and connected to between the first shaft section and the first shaft holder, so that a plurality of openings are formed between any two adjacent first connecting ribs for a fluid to flow therethrough. The first shaft section has a first spring fitted therearound. The first shaft includes a first shaft body portion and a supporting base located at two opposite ends thereof. The first shaft body portion is inserted into the first shaft hole of the first shaft holder, and the supporting base closes the through hole on the first shell. The fixing cover includes a covering section and a second penetrating hole axially extending through the covering section; and the fixing cover is correspondingly covered onto the annular receiving groove on the fixing seat to complete the first coupler.

The second coupler includes a second shell, a movable valve, and a second shaft.

The second shell has a first end and a second end. The first end is formed into a second shaft section having a second shaft hole, and a plurality of second connecting ribs is extended from the second shaft section to connect to the first end, such that a plurality of openings are formed between any two adjacent second connecting ribs. The second end is a flared connection opening; and the second end together with the first end defines a valve moving space between them. The movable valve is movably mounted in the valve moving space and has a second through hole. An end of the movable valve located opposite to the second shell is pressed against by a second spring; and the second spring has another end pressed against an inner side of the first end of the second shell. The second shaft has two ends formed into a shaft head section and a fixedly connected base. The fixedly connected base is inserted into the second shaft hole on the first end of the second shell; and the shaft head section correspondingly closes the second through hole on the movable valve.

When the first and the second coupler are assembled together to form the pipe coupling structure, the second connection section of the first coupler is extended into and connected to the second coupler, and the first and the second shaft are connected end to end. When the second connection section of the first coupler is pushed to move the movable valve deeper into the second coupler, the second shaft correspondingly extends through the movable valve to push the first shaft toward the first shaft holder and the through hole on the second connection section of the first shell is opened, so that the first and the second coupler are internally fluidly communicable with each other at the through hole on the first shell. Since the first shaft moving space has a variable diameter gradually increased inward from the through hole toward an inner side of the first shell, a cross-sectional area of the first shaft moving space between the curved inner wall surface and the first shaft and a cross-sectional area between the curved inner wall surface and the second shaft are similar to each other. With this arrangement, the volume of the fluid that can flow smoothly through the connected first and second shell is increased, giving the pipe coupling structure upgraded connection reliability.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

Figure 1A:
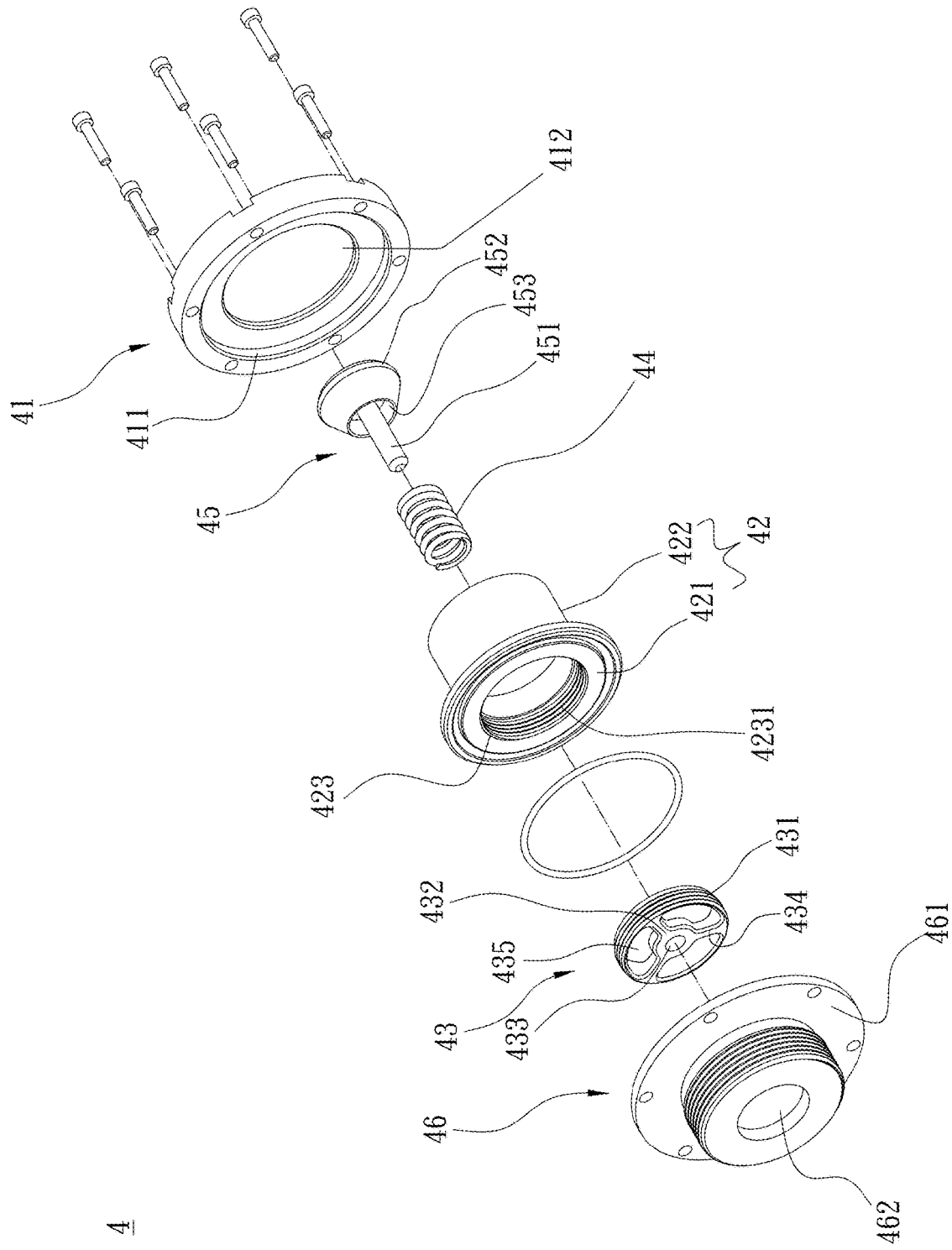
FIG. 1A is an exploded perspective view of a first coupler included in the pipe coupling structure for fluid transportation system according to an embodiment of the present invention.

The present invention will now be described with a preferred embodiment thereof.

Please refer to FIGS. 1A, 1B, 2A, 2B, and 3A to 3C. As shown, a pipe coupling structure for fluid transportation system includes a first coupler 4 and a second coupler 5. For the purpose of conciseness and clarity, the present invention is also briefly referred to as the pipe coupling structure and denoted by reference numeral 100 herein.

Figure 1B:
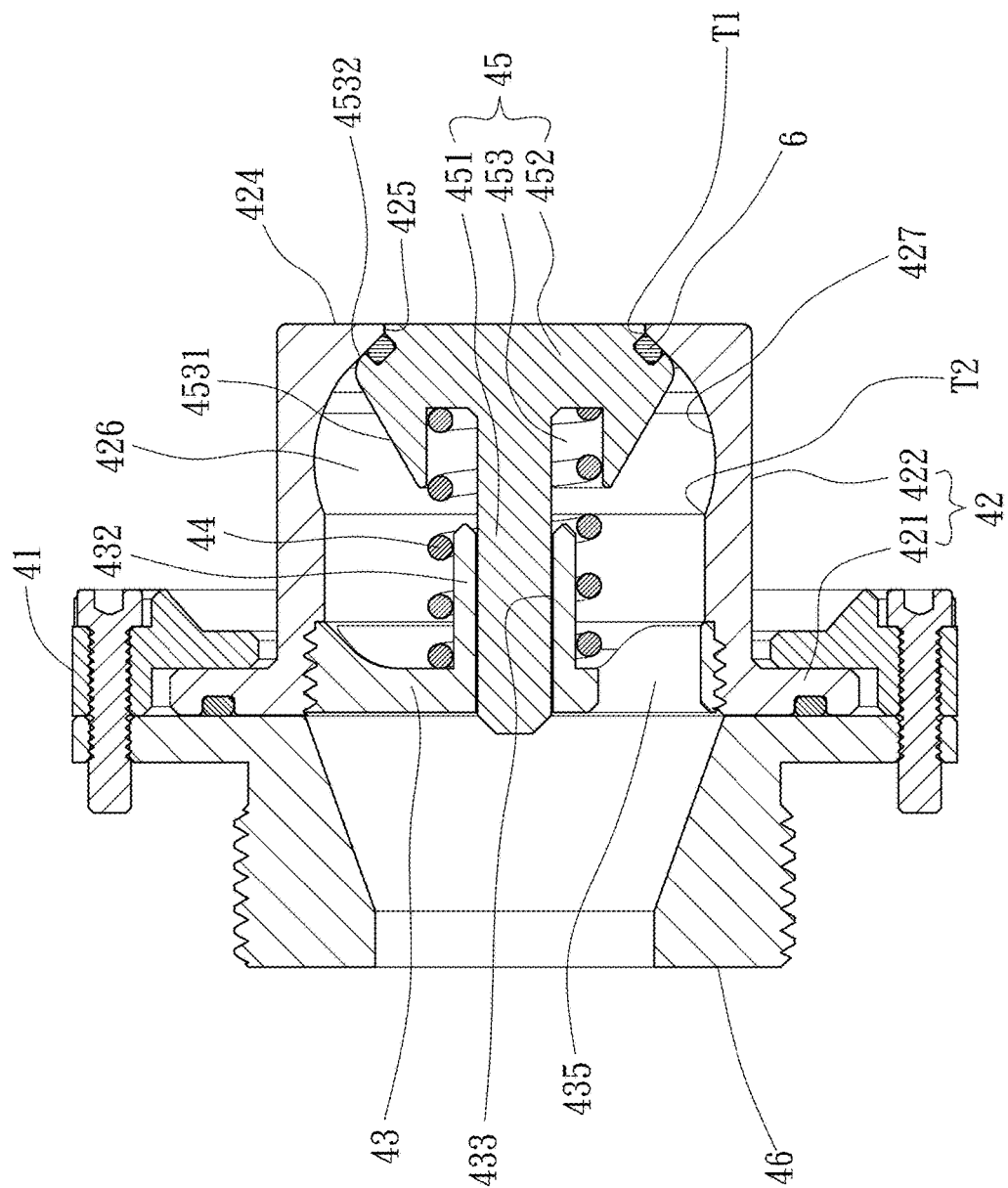
FIG. 1B is an assembled sectional side view of FIG. 1A.
Figure 2A:
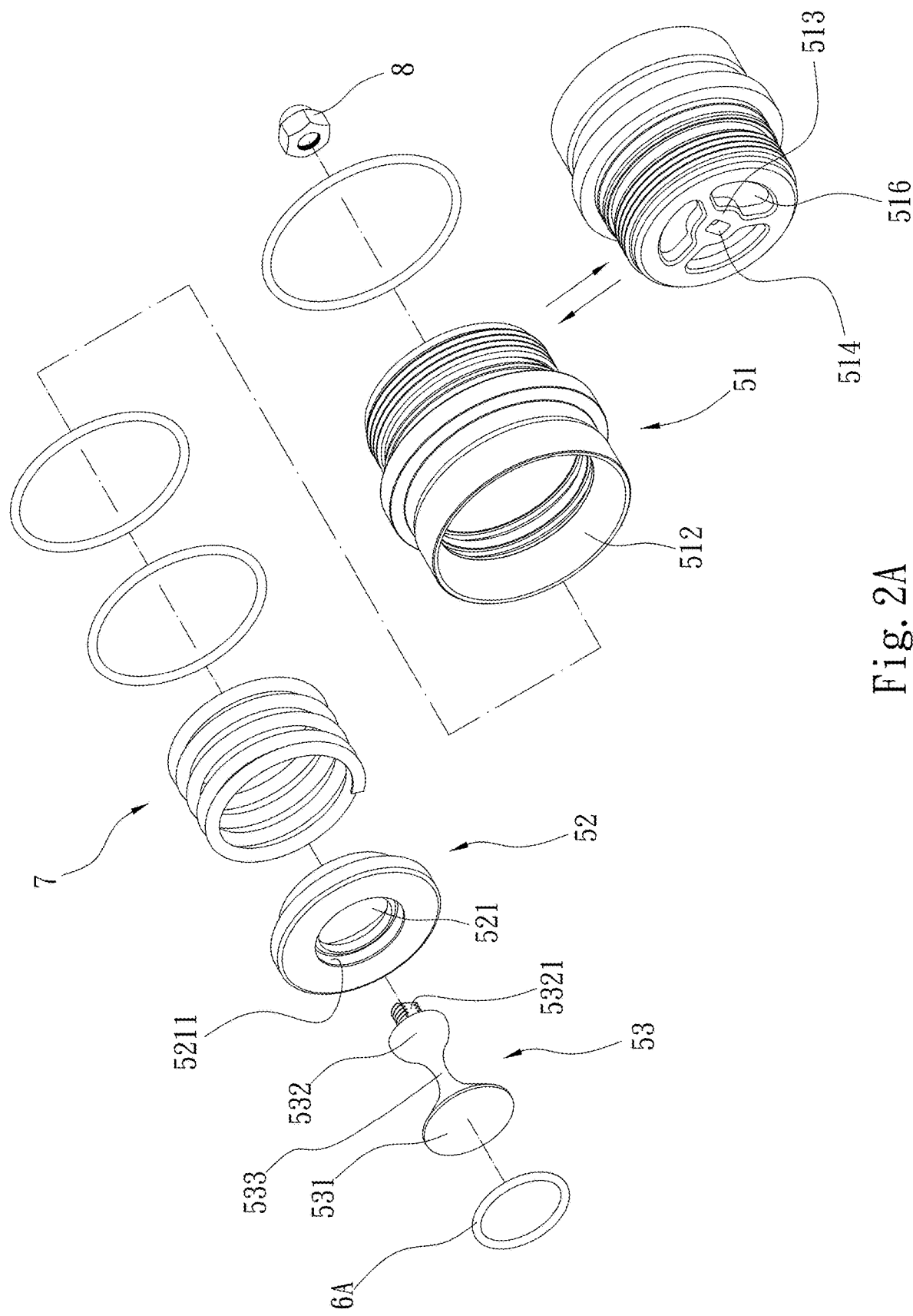
FIG. 2A is an exploded perspective view of a second coupler included in the pipe coupling structure for fluid transportation system according to an embodiment of the present invention.
Figure 2B:
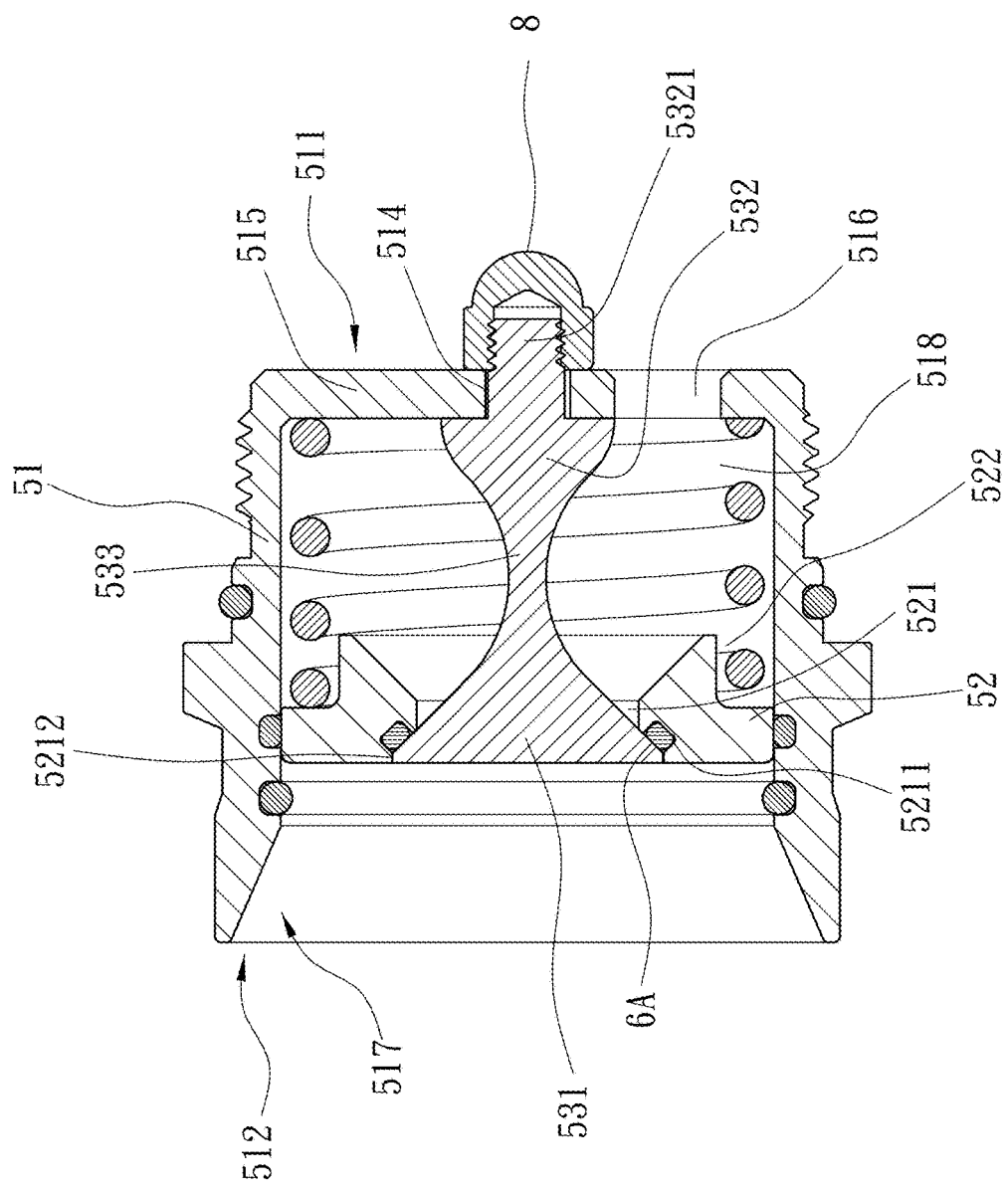
FIG. 2B is an assembled sectional side view of FIG. 2A.

As can be seen in FIGS. 1A and 1B, the first coupler 4 includes a fixing seat 41, a first shell 42, a first shaft holder 43, a first spring 44, and a first shaft 45, and a fixing cover 46.

The fixing seat 41 has an annular receiving groove 411 formed on one side thereof, and defining a centered first penetrating hole 412. The first shell 42 includes a first connection section 421, a second connection section 422, and a mounting bore 423 formed at an axially rear end of the first connection section 421 facing toward the fixing cover 46. The second connection section 422 has an axially rear end facing away from the fixing cover 46 and forming a contact surface 424 with an axially through hole 425. A length of the second connection section 422 located adjacent to the through hole 425 defines a first shaft moving space 426, which has a variable diameter gradually increased from the through hole 425 toward an inner side of the second connection section 422 to form a curved inner wall surface 427 in the first shell 42. The mounting bore 423 is communicable with the first shaft moving space 426 and the through hole 425; the first connection section 421 of the first shell 42 is set in the annular receiving groove 411, and the second connection section 422 is extended through the first penetrating hole 412 to assemble to the fixing seat 41.

The first shaft holder 43 is correspondingly connected to the mounting bore 423 of the first shell 42 through meshing of a male thread 431 provided on a circumferentially outer surface of the first shaft holder 43 with a female thread 4231 provided on an inner circumferential surface of the mounting bore 423 on the first shell 42. The first shaft holder 43 includes a first shaft section 432 and a first shaft hole 433. A plurality of first connecting ribs 434 is extended from an outer circumferential surface of the first shaft section 432 to an inner circumferential surface of the first shaft holder 43, such that a plurality of openings 435 are formed between any two adjacent first connecting ribs 434 for a fluid to flow therethrough. The first spring 44 is fitted on around the first shaft section 432.

The first shaft 45 includes a first shaft body portion 451 and a supporting base 452. The supporting base 452 has one side forming a locating recess 453, from which the first shaft body portion 451 is extended axially outward, and another side being a flat surface. An outer peripheral wall surface of the supporting base 452 consists of an axially inner beveled surface 4531 and an axially outer beveled surface 4532. A sealing ring 6 is provided around the axially outer beveled surface 4532. The first shaft body portion 451 is inserted into the first shaft hole 433 to connect to the first shaft holder 43, while the supporting base 452 extends through the through hole 425 of the first shell 42 to close the through hole 425.

The fixing cover 46 includes a covering section 461 and a second penetrating hole 462 extending through the covering section 461. The fixing cover 46 is correspondingly covered onto the annular receiving groove 411 on the fixing seat 41, such that the first shell 42, the first shaft holder 43, the first spring 44, and the first shaft 45 are fixedly assembled to form the first coupler 4.

The second coupler 5 includes a second shell 51, a movable valve 52, and a second shaft 53.

The second shell 51 has a first end 511 and a second end 512. The first end 511 is formed into a second shaft section 513 having a second shaft hole 514. A plurality of second connecting ribs 515 extends from an outer circumferential surface of the second shaft section 513 to connect to the first end 511, such that a plurality of openings 516 are formed between any two adjacent second connecting ribs 515 for a fluid to flow therethrough. The second end 512 is an open end forming a flared connection opening 517, which is tapered axially inward from the second end 512 of the second shell 51, and a valve moving space 518 is formed between the second end 512 and the first end 511 of the second shell 51.

The movable valve 52 is movably mounted in the valve moving space 518 to move axially in the second shell 51. The movable valve 52 has a second through hole 521 formed on a central area thereof to extend through the movable valve 52. A second spring 7 has an end pressed against an end of the movable valve 52 located opposite to the first end 511 of the second shell 51, and another end pressed against an inner side of the first end 511 of the second shell 51.

Further, the movable valve 52 includes a fitting section 522 projected from one side of the movable valve 52 facing toward the first end 511 of the second shell 51. The end of the second spring 7 pressed against the end of the movable valve 52 is fitted on around the fitting section 522.

The second through hole 521 on the movable valve 52 is internally provided with a sealing part annular groove 5211 for setting a sealing part 6A therein. The sealing part annular groove 5211 has a hole size larger than that of the second through hole 521, such that a stepped limiting section 5212 is formed between the sealing part annular groove 5211 and the second through hole 521.

The second shaft 53 has two ends formed into a shaft head section 531 and a fixedly connected base 532. A second shaft body portion 533 is formed between the shaft head section 531 and the fixedly connected base 532 of the second shaft 53. A connecting stem 5321 is projected from an end of the fixedly connected base 532 opposite to the shaft head section 531. The connecting stem 5321 is inserted into the second shaft hole 514 on the second shell 51 and is fixed in place by a nut 8 screwed thereto, and the shaft head section 531 correspondingly closes the second through hole 521 on the movable valve 52.

Figure 3A:
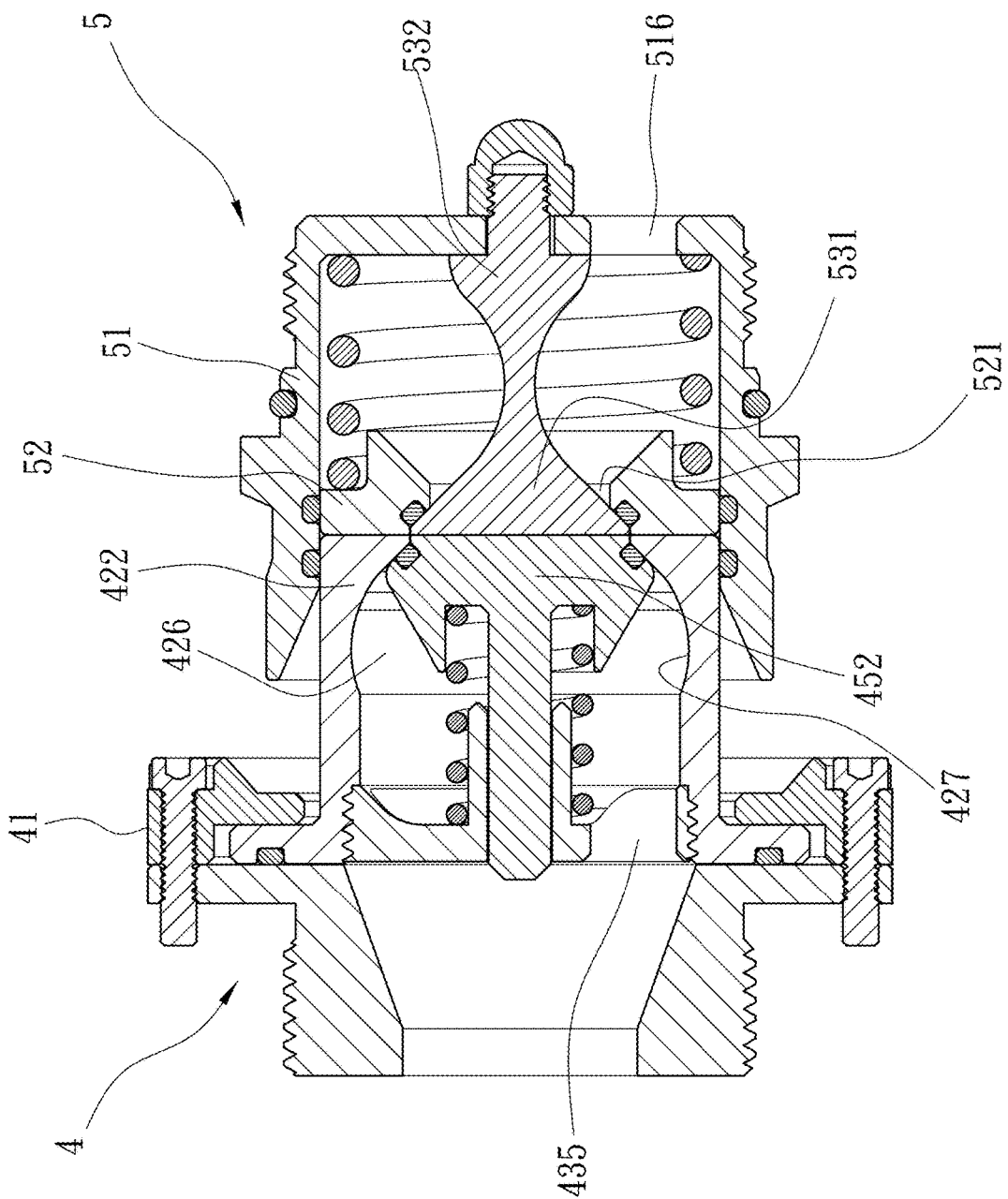
FIG. 3A is an assembled sectional side view of the pipe coupling structure of the present invention showing the first and the second coupler are assembled to close the pipe coupling structure.

Please refer to FIG. 3A along with FIGS. 1A to 2B. When the first and the second coupler 4, 5 are connected end to end to form the pipe coupling structure 100, the contact surface 424 of the first shell 42 is in contact with the movable valve 52, and the supporting base 452 of the first shaft 45 is in contact with the shaft head section 531 of the second shaft 53. At this point, the supporting base 452 of the first shaft 45 is located in the valve moving space 518 and keeps closing the through hole 425 on the contact surface 424, while the axially outer beveled surface 4532 and the sealing ring 6 together seal the through hole 425. Meanwhile, the shaft head section 531 of the second shaft 53 also correspondingly close the stepped limiting section 5212, and the sealing part 6A set in the sealing part annular groove 5211 seals the second through hole 521 on the movable valve 52, so that the pipe coupling structure 100 is in a sealed state.

Please refer to FIGS. 3B, 3C, 4 and 5 along with FIGS. 1A, 1B, 2A, 2B, and 3A. When the first coupler 4 is correspondingly connected to the second coupler 5 end to end and the first shell 42 of the first coupler 4 are pushed to drive the movable valve 52 rearward into an inner side of the second coupler 5, the second spring 7 pushing against the movable valve 52 is also elastically compressed. At this point, the shaft head section 531 of the second shaft 53 is forward protruded from the second through hole 521 on the movable valve 52, and the first shaft 45 in contact with the shaft head section 531 is pushed by the shaft head section 531 of the second shaft 53 to move rearward and retract into the first shaft moving space 426. At this point, the through hole 425 previously closed by the first shaft 45 is opened from the closed state, and the first and the second coupler 4, 5 are internally communicable with each other.

Figure 3B:
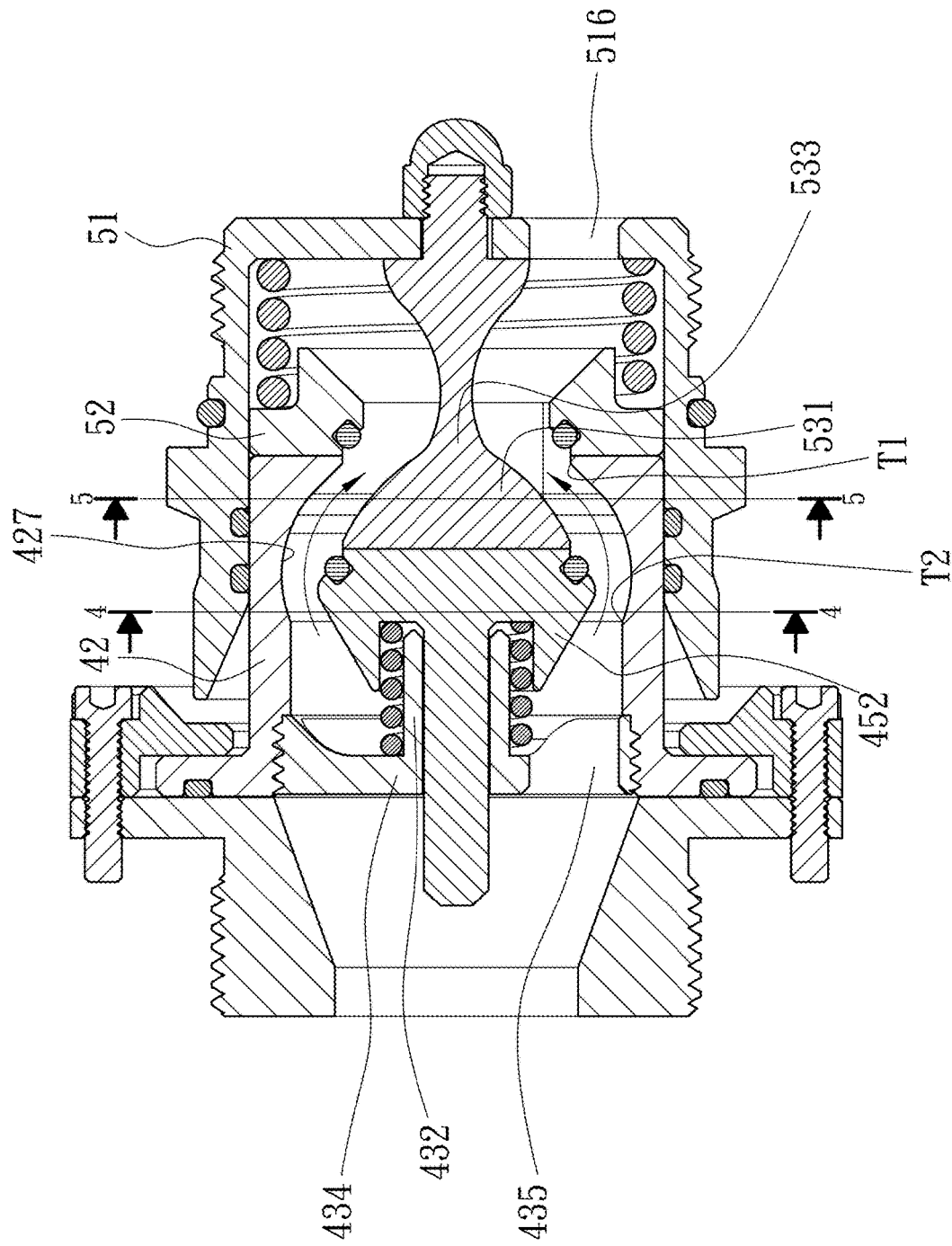
FIG. 3B is another an assembled sectional view of the pipe coupling structure of the present invention showing the first and the second coupler are assembled to open the pipe coupling structure.
Figure 3C:
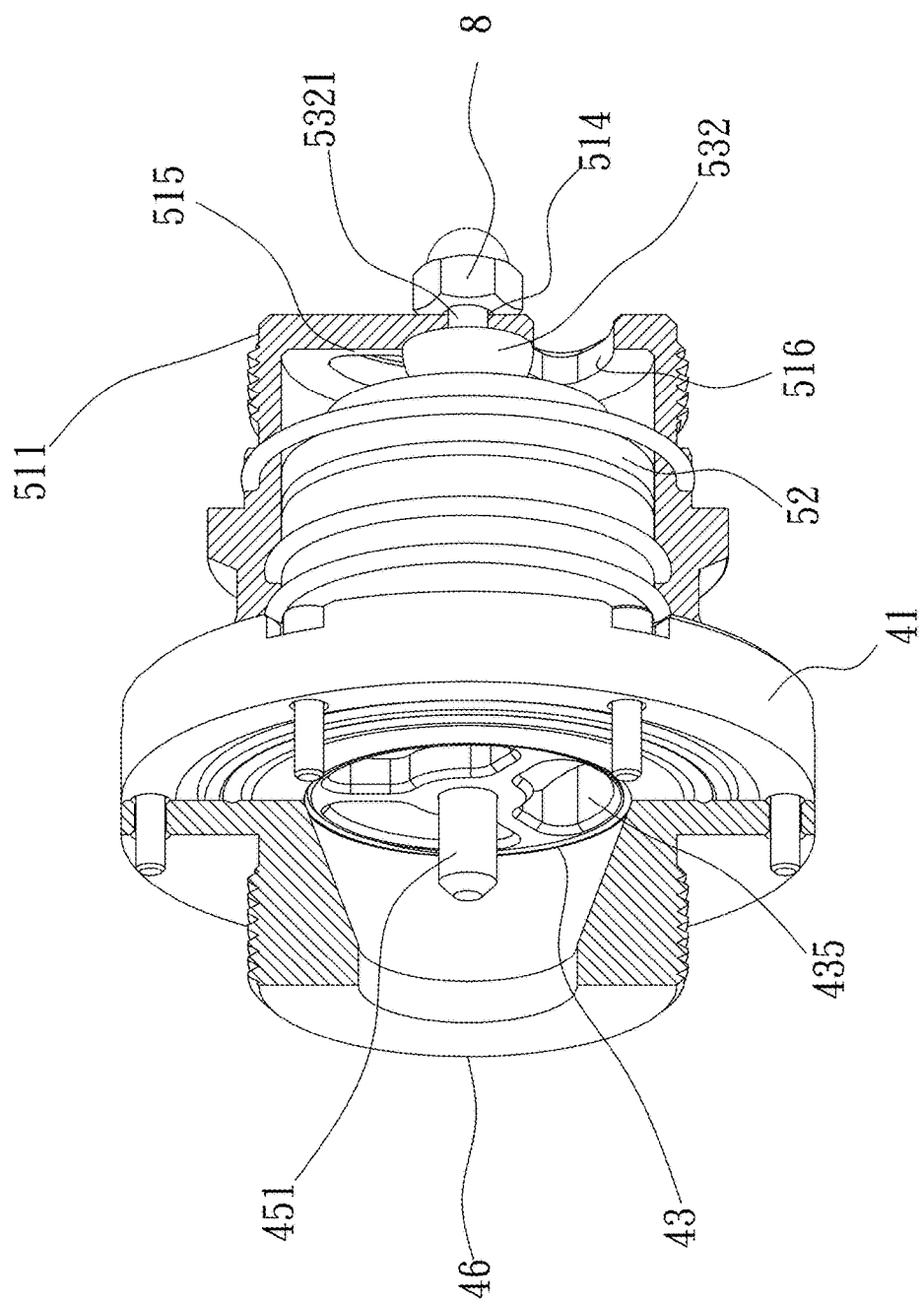
FIG. 3C is a cutaway view of the pipe coupling structure of the present invention.
Figure 5:
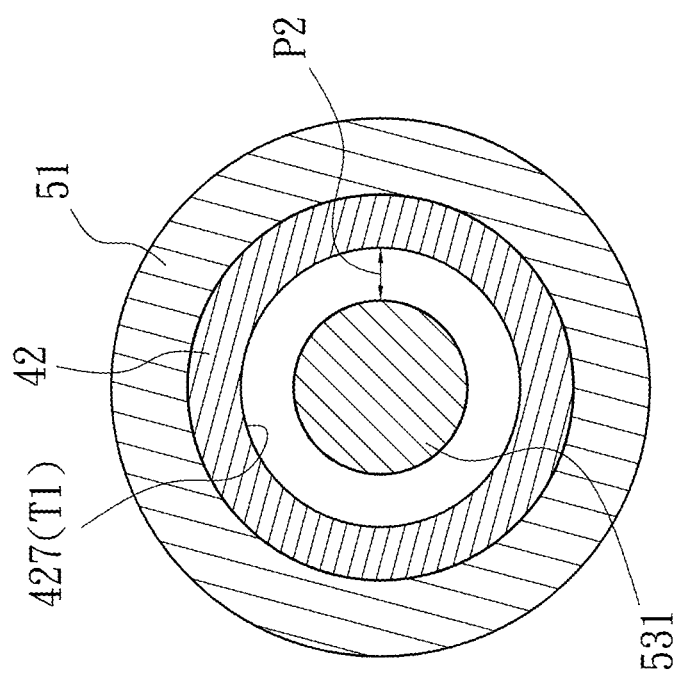
FIGS. 4 and 5 are cross sectional views taken along line 4-4 and line 5-5 of FIG. 3B, respectively.
Figure 4:
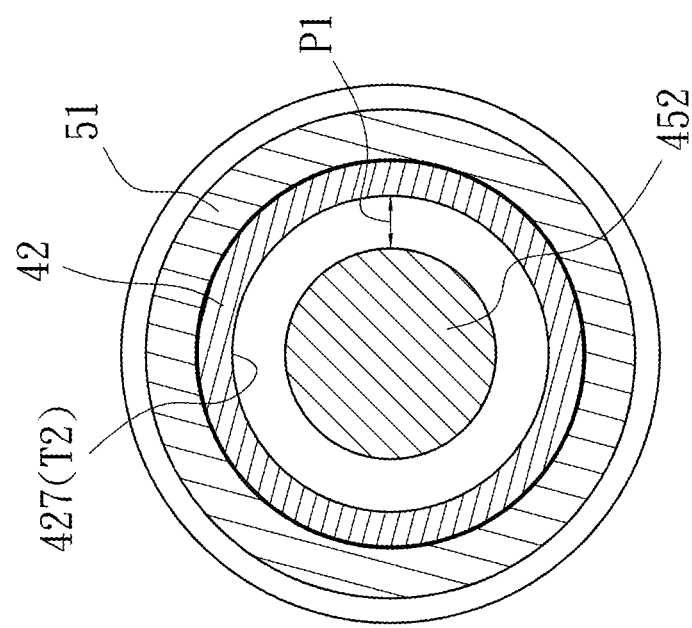
Figure 6:
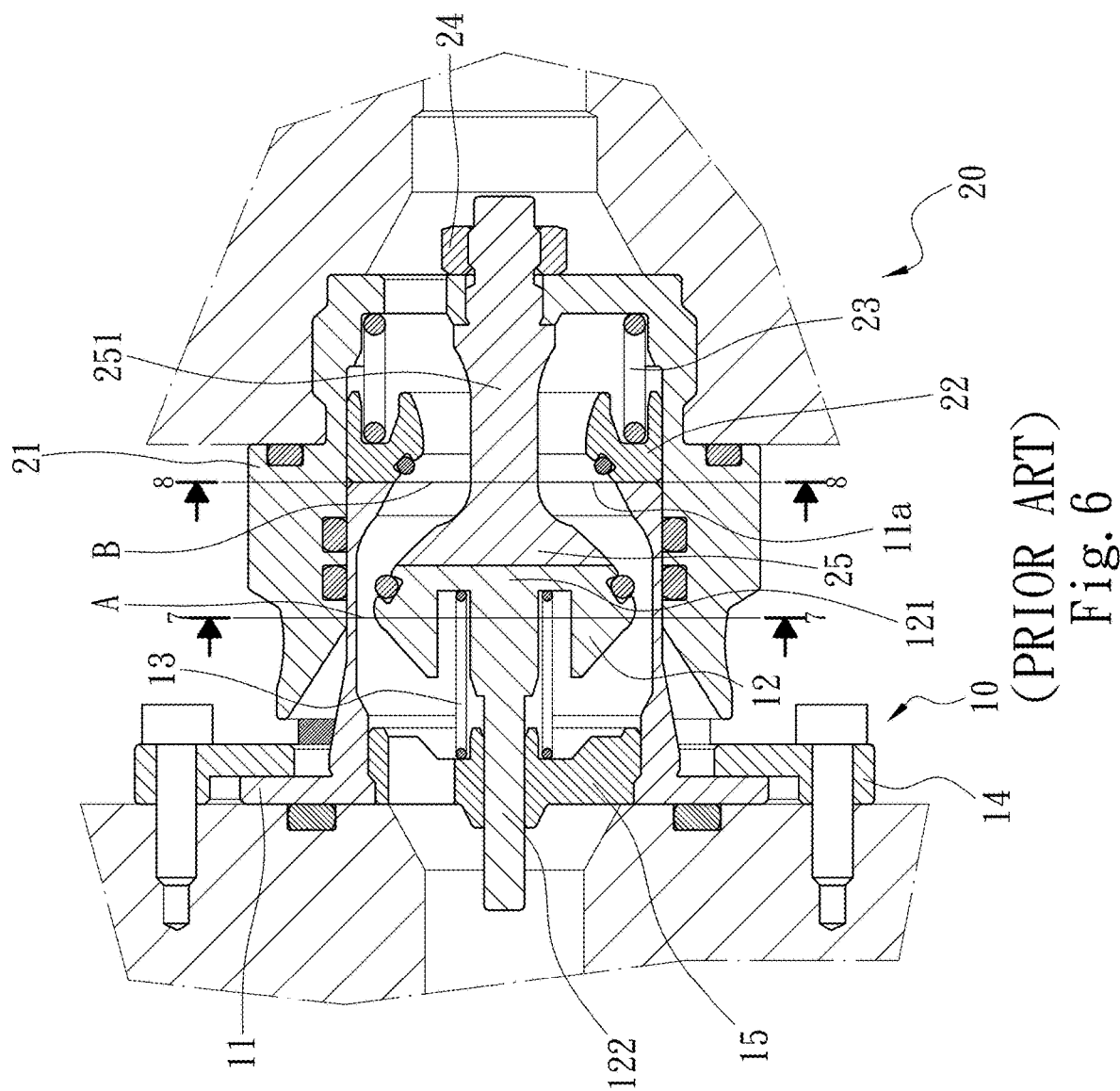
FIG. 6 is an assembled sectional side view of a conventional pipe coupling structure with blind-mate male and female pipe couplers.
Figure 8:
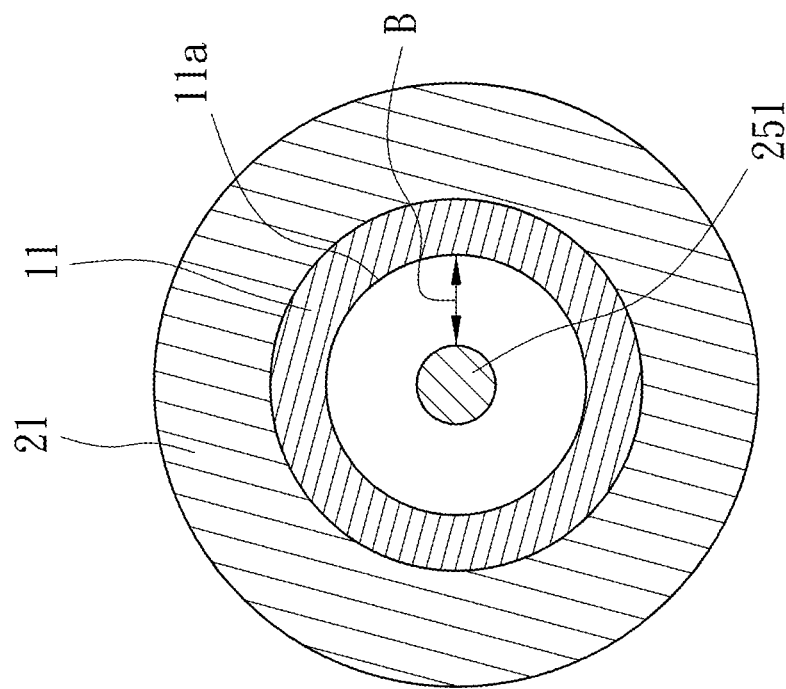
FIGS. 7 and 8 are sectional views taken along lines 7-7 and 8-8 of FIG. 6, respectively.
Figure 7:
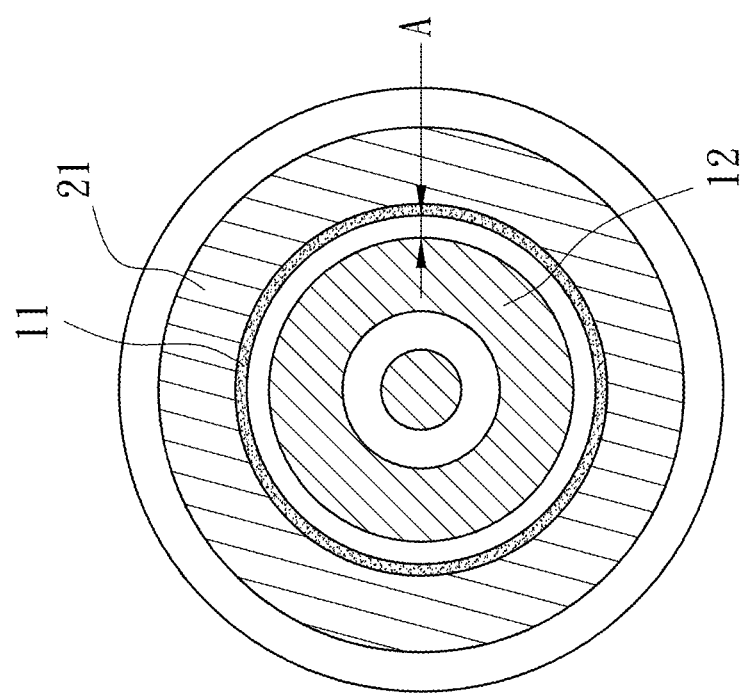

Please refer to FIGS. 4 and 5 along with FIG. 3B. When the first and the second coupler 4, 5 are internally communicable with each other to set the pipe coupling structure 100 in the opened state, a length of the first shaft moving space 426 has a first passage cross-sectional area P1 defined between a second position T2 on the curved inner wall surface 427 and the supporting base 452 of the first shaft 45, as shown in FIG. 4; and another length in the first shaft moving space 426 has a second passage cross-sectional area P2 defined between a first position T1 on the curved inner wall surface 427 and the shaft head section 531 of the second shaft 53, as shown in FIG. 5. Since the first passage cross-sectional area P1 is equal or similar to the second passage cross-sectional area P2, the fluid flowing through the first and the second passage cross-sectional area P1, P2 of the first shaft moving space 426 can maintain the same flowing speed and flowing pressure. With the present invention, the pipe coupling structure 100 ensures upgraded watertight connection and keeps or increases the flowing speed and flowing pressure of the fluid flowing therethrough.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A pipe coupling structure for a fluid transportation system, comprising:
   a first coupler including:
      a fixing seat having an annular receiving groove formed on one side thereof, and defining a first penetrating hole axially extending through the fixing seat;
      a first shell including a first connection section, a second connection section, and a mounting bore formed on the first connection section; the second connection section having a through hole located opposite to the mounting bore, and the through hole extending axially into the second connection section to form a first shaft moving space having a variable diameter gradually increased axially inward from the through hole; the first connection section is received in the annular receiving groove, and the second connection section being extended through the first penetrating hole to assemble to the fixing seat;
      a first shaft holder being correspondingly connected to the mounting bore of the first shell; the first shaft holder including a first shaft section and a first shaft hole and having a plurality of first connecting ribs extended and connected to between the first shaft section and the first shaft holder, so that a plurality of openings are formed between any two adjacent first connecting ribs; and the first shaft section having a first spring fitted therearound;
      a first shaft including a first shaft body portion and a supporting base;
      the first shaft body portion being inserted into the first shaft hole of the first shaft holder, and the supporting base closing the through hole on the first shell; and
      a fixing cover including a covering section and a second penetrating hole extending through the covering section; and the fixing cover being correspondingly covered onto the annular receiving groove on the fixing seat; and
   a second coupler including:
      a second shell having a first end and a second end; the first end being formed into a second shaft section having a second shaft hole, and having a plurality of second connecting ribs extended from the second shaft section to the first end, such that a plurality of openings are formed between any two adjacent second connecting ribs; and the second end and the first end together defining a valve moving space between them;
      a movable valve being movably mounted in the valve moving space and having a second through hole formed thereon; an end of the movable valve located opposite to the first end of the second shell being pressed against by a second spring; and the second spring having another end pressed against the first end of the second shell; and
      a second shaft having two ends formed into a shaft head section and a fixedly connected base; the fixedly connected base having a connecting stem projected from an end thereof to insert into the second shaft hole on the second shell; and the shaft head section correspondingly closing the second through hole on the movable valve; and
   wherein when the first and the second coupler are assembled together to form the pipe coupling structure, the second connection section of the first coupler is extended into and connected to the second coupler, and the first and the second shaft are connected end to end; and when the second connection section of the first coupler is pushed to move the movable valve deeper into the second coupler, the second shaft correspondingly extends through the movable valve to push the first shaft toward the first shaft holder and the through hole on the first shell is opened, so that the first and the second coupler are internally fluidly communicable with each other; and wherein since the first shaft moving space has the variable diameter gradually increased axially inward from the through hole, a fluid can flow therethrough more smoothly.

2. The pipe coupling structure as claimed in claim 1, wherein the first connection section is located at an end of the first coupler to protrude radially relative to the second connection section; the first connection section having an outer diameter smaller than that of the annular receiving groove, such that the first connection section received in and connected to the annular receiving groove allows finely adjustment of a central axis of the first coupler relative to the fixing cover; and the openings on the first shaft holder being communicable with the first shaft moving space and the through hole of the second connection section of the first shell.

3. The pipe coupling structure as claimed in claim 1, wherein the second end of the second shell is a flared connection opening.

4. The pipe coupling structure as claimed in claim 1, wherein the first shaft hole axially extends through the first shaft holder and the first shaft section.

5. The pipe coupling structure as claimed in claim 4, wherein the supporting base of the first shaft is provided on one side with a locating recess, from which the first shaft body portion is extended axially outward, and another opposite side of the supporting base being a flat surface; an outer peripheral wall surface of the supporting base consisting of an axially inner beveled surface and an axially outer beveled surface; and a sealing ring being provided between the axially inner and outer beveled surface.

6. The pipe coupling structure as claimed in claim 1, wherein the movable valve includes a fitting section, and the end of the second spring pressed against the movable valve being fitted on around the fitting section.

7. The pipe coupling structure as claimed in claim 1, wherein the second through hole of the movable valve has a sealing part annular groove formed therein; the sealing part annular groove having a hole size larger than that of the second through hole, such that a stepped limiting section is formed between the sealing part annular groove and the second through hole.

8. The pipe coupling structure as claimed in claim 1, wherein the second shaft includes a second shaft body portion located between the shaft head section and the fixedly connected base; and an end of the fixedly connected base opposite to the second shaft body portion being the connecting stem projected axially outward.

9. The pipe coupling structure as claimed in claim 1, wherein a locating recess is formed between the first shaft body portion and the supporting base of the first coupler; and the first spring having an end connected to the first shaft holder and another end pressed against the locating recess of the first shaft.

\* \* \* \* \*